United States Patent [19]

Kobashi

[11] 4,229,883
[45] Oct. 28, 1980

[54] MEASURING INSTRUMENT WITH DIGITAL DISPLAY

[75] Inventor: Takashi Kobashi, Utsunomiya, Japan

[73] Assignee: Mitutoyo Mfg. Co., Ltd., Tokyo, Japan

[21] Appl. No.: 35,899

[22] Filed: May 3, 1979

[30] Foreign Application Priority Data

May 4, 1978 [JP] Japan ................................. 53/53460

[51] Int. Cl.³ ........................... G01B 7/02; G01B 5/02
[52] U.S. Cl. .................................. 33/143 L; 33/125 A
[58] Field of Search ............... 33/143 L, 147 N, 1 N, 33/125 A

[56] References Cited

U.S. PATENT DOCUMENTS

| 3,142,121 | 7/1964 | Stefanov | 33/143 L |
|---|---|---|---|
| 4,008,523 | 2/1977 | von Voros | 33/143 L |
| 4,037,325 | 7/1977 | Weber et al. | 33/147 N |
| 4,151,649 | 5/1979 | Tatsuzawa | 33/1 N |

*Primary Examiner*—William D. Martin, Jr.
*Attorney, Agent, or Firm*—Koda and Androlia

[57] ABSTRACT

A measuring instrument with digital display including a relatively elongate caliper body formed with a measuring part adapted to make measuring engagement with an article to be measured and a slider freely slidable in a longitudinal direction of the caliper body and formed with a measuring part disposed opposite to the measuring part of the caliper body. In the measuring instrument a transparent linear scale is fixedly disposed on the caliper body with its axis extending in the longitudinal direction of the caliper body and a transparent index scale is mounted on the slider with its calibrated face disposed opposite to the calibrated face of the linear scale and slightly spaced apart relationship. A measuring circuit including a digital display element is mounted in the slider and is electrically connected to a light emitting element and a light receiving element mounted in the slider. The light emitting element and the light receiving element are disposed opposite to each other with the linear scale and the index scale interposed therebetween.

2 Claims, 4 Drawing Figures

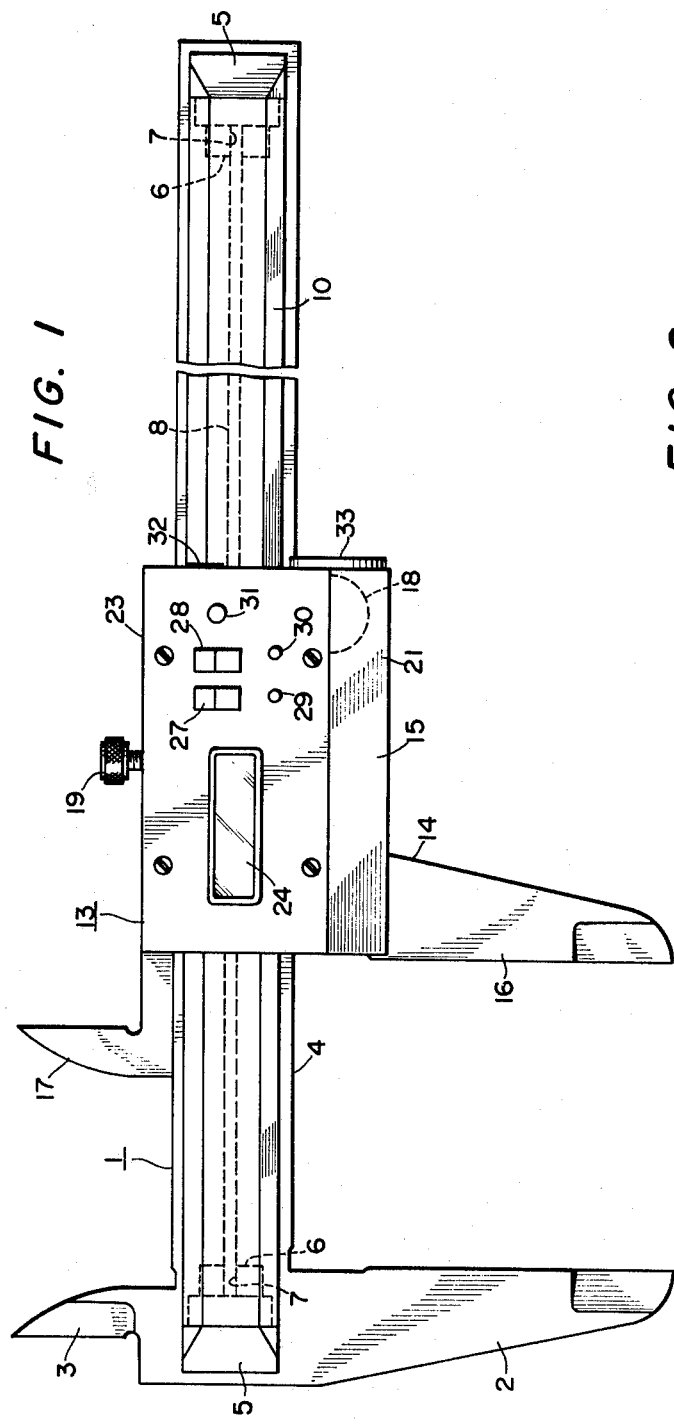
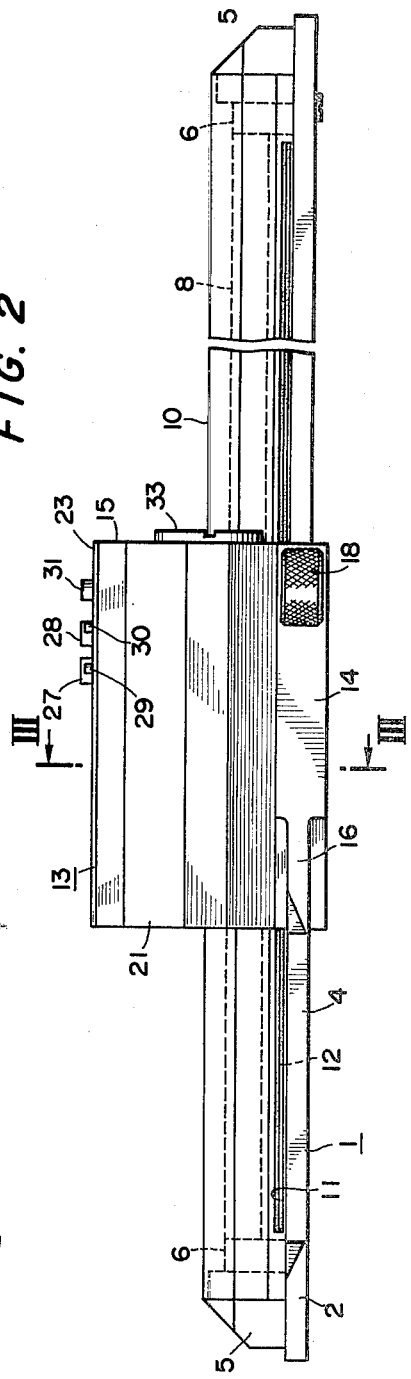

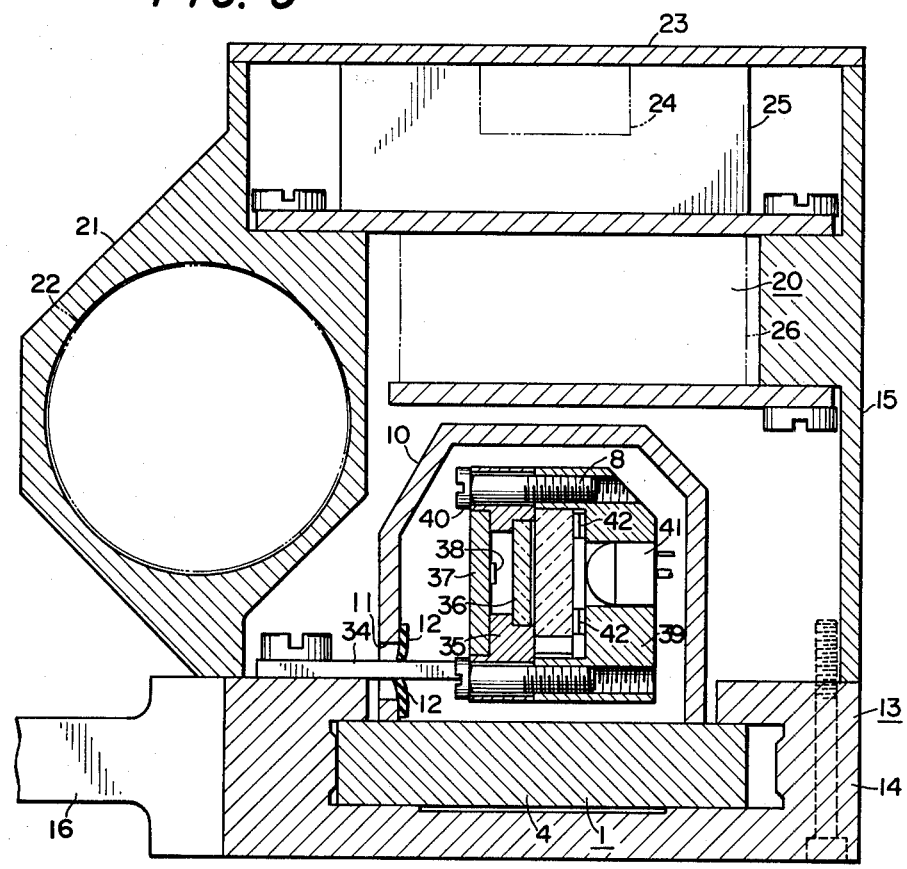
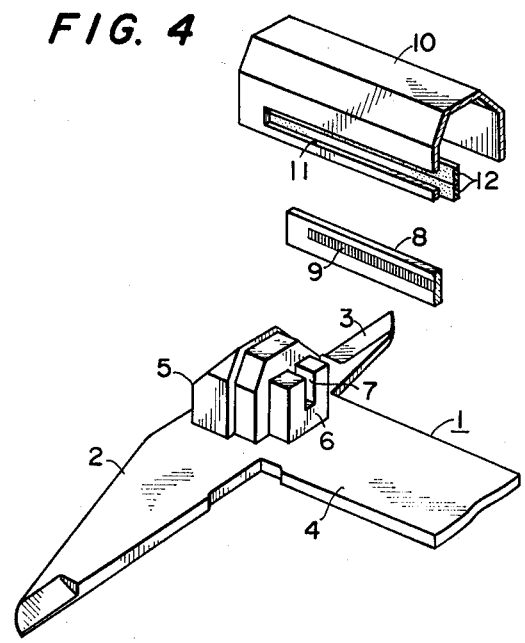

MEASURING INSTRUMENT WITH DIGITAL DISPLAY

BACKGROUND OF THE INVENTION

1. Field of the Invention

This invention relates to measuring instruments and more particularly to measuring instruments with digital display.

2. Prior Art

In conventional length measuring instruments of the mechanical type, a vernier scale or a dial indicator is generally used to measure the dimensions. These conventional length measuring instruments have however been defective in that there is a possiblity of misreading the instrument due to reading errors and human error due to the fact that the user of the measuring instrument reads the mechanically measured dimension with his eyes. Such conventional length measuring instruments have also been defective in that the fixed calibrations on the main scale makes it impossible to make relative measurements even when such a measurement is desired.

With the progression in the art of digital displays in various industrial fields, digital displays have been progressively applied to various types of measuring instruments. Caliper devices are not an exception and there exists calipers with a digital display.

In one prior art device, a so-called indutosyn is employed in which a main scale and an auxiliary scale provided with comb-like printed patterns are movable relative to each other and a change in the value of current in a printed patterns due to the relative movement of the main and auxiliary scales is measured as the dimension. Another caliper device of the prior art is wherein a so-called magnescale is employed in which magnetic calibrations are provided on a magnetic tape and a signal produced due to the movement of the scales relative to the magnetic tape is sensed to measure the dimension. In still another caliper device, a so-called linear encoder is employed in which light is directed toward an optical measuring means, for example a first member of relatively large length carrying calibrations provided on a material having a high index of reflection. The light reflected from the first member is received by a second member of relatively short length carrying similar calibrations and the first and second members are linearly moved relative to each other so that bright and dark patterns of light or the moire fringe produced by the reflected light is sensed to measure the dimension. In yet another caliper device a so-called rotary encoder is employed in which a rotatable first member is rotated relative to a rotatable second member and the bright and dark pattern of the light or the moire fringe thus produced is sense to measure the dimension. However, in any one of such prior art caliper devices which have a digital display, the digital display is generally disposed separate from the caliper body, the main scale or the slider, and is generally electrically connected to the later by a signal transmission cable.

Thus, these prior art caliper devices with digital display type cannot be conveniently used on site since the necessity of providing an electrical connection to the cable leads to the inefficient use of the caliper device and leads to an inconvenience in handling.

Among various caliper devices with a digital display type, there is included a special type which employs an optical linear encoder for dimension measurements. In this caliper device, a linear scale of relatively large length is embedded in the body of a main scale and light is directed towards the linear scale from above or below so that the light reflected therefrom is received by an associated scale to measure the dimension. However, this caliper device utilizing reflected light is disadvantageous in that emitting element of large capacity or size is required in order to compensate for losses of light due to, for example, scattering and measurement with high accuracy is impossible due to difficulty of providing calibrations spaced apart from each other by a very small distance, for example 10 micrometers. In this type of caliper device, any attempt to improve the accuracy of measurement results inevitably in a very high cost.

SUMMARY OF THE INVENTION

It is a principle object of the present invention to provide a caliper device which can measure dimensions sufficiently and which can digitally display the measured dimensions.

In keeping with the principles of the present invention, the objects are accomplished by a unique caliper device which includes a linear scale made of a transparent material, a light emitting element and an associated light receiving element disposed on opposite sides of the linear scale so as to prevent losses of light due to scattering of the light emitting element.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 1 is a plan view of one embodiment of a caliper device with digital display in accordance with the teachings of the present invention;

FIG. 2 is a front elevation view of the caliper device shown in FIG. 1;

FIG. 3 is an enlarged sectional view along the line III—III in FIG. 2; and

FIG. 4 is an exploded perspective view of part of the caliper body, linear scale and cover member shown in FIG. 1.

DETAILED DESCRIPTION OF THE INVENTION

Referring more particularly to the drawings, shown therein is a caliper device with digital display in accordance with the teachings of the present invention. In FIGS. 1 and 2, the caliper with digital display includes a caliper body 1 corresponding to the main scale of prior art caliper devices which includes a measuring part at one end thereof to make measuring engagement with an article whose dimensions are to be measured. This measuring part includes an outside-dimension measuring jaw 2 and an inside-dimension measuring bill 3. The caliper body 1 further includes an elongate guide part 4 extending in orthogonal relationship from the measuring part. A pair of cover receiving members 5 and a pair of scale receiving members 6, which make intimate engagement at its outer end with the inner end of the associated cover receiving members 5, are provided on the upper face of the caliper body 1 at the longitudinal opposite ends of the caliper body. These cover receiving members 5 and scale receiving members 6 are firmly fixed by screws (not shown) to the caliper body 1.

The scale receiving member 6 provided in pairs are formed with a pair of aligned grooves 7 extending in a direction orthogonal to the face of the caliper body 1. A linear scale 8 extending in a longitudinal direction of caliper body 1 is inserted into and fixed at its opposite ends in the aligned groove 7 of the scale receiving member 6 which are provided in a pair. This linear scale 8 is made of a transparent material such as glass and calibrations 9 are formed on one of its side faces, as best shown in FIG. 4. The linear scale 8 is thus provided on the upper face of the caliper body 1 in a relation in which the side face of the linear scale 8 formed with the calibration 9 makes a right angle with the upper face of the caliper body 1.

A cover member 10 of generally U-shaped cross section, as best shown in FIG. 4, is fitted from above on the cover receiving members 5 provided in pairs so as to enclose the linear scale 8 therein. An elongate slit 11 is formed in one of the side walls of the cover member 10 to extend substantially throughout the length of the cover member 10 except the opposite end portions of the cover member 10, as is shown in FIG. 4. A pair of elongate, dust preventing members 12 are provided on the inner face of the cover made of member 10 to positions inside the slit 11 so as to close the slit 11. The dust-preventive members 12 are made of a soft pliable material such as rubber so that, when one end of an arm, to be described later, is inserted into the internal space of the cover member 10 through the slit 11, the portions of the dust-preventing members 12 engaged by the end portion of the arm are only flexed so that the remainder of the slit 11 can be maintained in a closed state of the remaining portion of the dust-preventing members 12.

A slider 13 is mounted on the guide part 4 of the caliper body 1 so as to be freely slidable in the longitudinal direction of the guide part 4. The slider 13 comprises a slider base 14 making sliding engagement with the guide part 4 of the caliper upper body 1 and a slider cover 15 which is fixed at its lower end to the upper face of the slider base 14 by screws and which is shaped so as to straddle the cover member 10. The slider base 14 is provided with a measuring part which includes an outside-dimension measuring jaw 16 and an inside-dimension measuring bill 17 disposed respectively opposite to the outside-dimension measuring jaw 2 and the inside-measuring bill 3 which constitutes the measuring part of the caliper body 1. The slider base 14 is further provided, on the side wall having the outside-dimension measuring jaw 16, with a knob 18 for causing sliding movement of the slider 13 relative to the caliper body 1. On the other side wall of the slider base 14 having the inside-dimension measuring bill 17, a fixing or holding screw 19 is mounted to fit or hold slider base 14 in a measuring position on the guide part 4 of the caliper body 1.

Referring to FIGS. 1, 2 and 3, an electrical measuring circuit 20 is provided in the space defined by the slider cover 15 and a rechargeable battery 22 such as a cadmium battery is provided in an extension 21 formed on one side wall of the slider cover 15. The measuring circuit 20 includes a digital display 24 such as a liquid crystal display element mounted on a surface panel 23 providing the upper wall of the slider cover 15, a counter 25 in the form of, for example, an LSI counter circuit applying its output signal to the digital display 24 and a preamplifier 26 for amplifying output signals of the light receiving element described later and applying such an amplified signal to the counter 25. Further provided on the surface panel 23 are a power supply on-off switch 27, an inch-millimeter display changeover switch 28, an inch displaying lamp 28 and a millimeter display lamp 30 selectively energized by the inch-millimeter change-over switch 28 and a preset switch 31. A charging plug 32 for charging the battery 22 and an access door 33 to be opened during replacement of the batter 22 are provided on the rear wall of the slider cover 15.

An arm 34 is fixed at one end thereof on the upper face of the slider base 14 within the internal space of the slider cover 15, as is shown in FIG. 3. The other end of the arm 34 extends through the slit 11 of the cover member 10 into the internal space of the cover member 10 while deforming the associated portions of the dust-preventing members 12. An index scale holder 35 is securely fixed to the end of the arm 34 extending into the internal space of the cover member 10. This index scale holder 35 securely holds index scale 36 which is in the form of, for example, a transparent glass sheet having calibrations on one of its faces. This index scale 36 is disposed opposite to and slightly spaced from the side face of the linear scale 8 which has the calibrations 9, such side face of the linear scale 8 will heretofore be referred to merely as a calibrated face. Element holding member 37 is provided on the rear face of the index scale holder 35 opposite to the non-calibrated face of the index scale 36, that is, opposite to the face of the index scale 36 remote from the linear scale 8. This element-holding member 36 holds a light receiving element 38 such as a photoelectric conversion element at a position opposite to the calibrated portion to the index scale 36. This light receiving element 38 is electrically connected to the preamplifier part 26 of the measuring circuit 20.

Another element-holding member 39 is fixed by screws 40 to the front face of the index scale holder 35 opposite to the linear scale 8 in such a relation that the member 39 straddles the linear scale 8. This element-holding member 39 securely holds in its middle portion a light emitting element 41 such as a light emitting diode which is positioned so that it can direct a beam of light exactly towards the center of the calibrations 9 on the linear scale 8. Bearing 42 of a resin material having a low co-efficient of friction such as for example a polyacetal resin are interposed between the linear scale 8 and the holding member 39 holding the light-emitting element 41 so as to insure smooth sliding movement of the linear scale 8 relative to the holding member 39. Thus, the light emitted from the light emitting element 41 passes through the linear scale 8 and then through the index scale 36 to be received by the light receiving element 38. The electrical output signal of the light receiving element 38 is applied to the preamplifier part 26 of the electrical circuit 20. Before the caliper device according to the present invention is used for measurement, a power source (not shown) is connected to the charging plate 32 to charge the rechargeable battery 22. After the battery 22 has been fully charged, the power supply cable is disconnected from the plug 32. Then, the outside-dimension measuring jaw 16 in the measuring part of the slider 13 is brought into intimate engagement with the associated outside-dimension measuring jaw 2 in the measuring part of the caliper body 1. The power supply on-off switch 27 is turned on to display a zero on the digital display part 24. As the measuring part of the slider 13 is moved away from the measuring part of the caliper body 1, the amount of movement of the slider 13 relative to the caliper body 1 is successively digitally displayed on the digital display part 24. Thus, the outside-dimension, for example, of an article to be measured is displayed on the digital display part 24 when the article is sandwiched between the outside-dimension measuring jaws 2 and 16 of the measuring parts of the caliper body 1 and the slider 13.

The manner of the digital display of the dimension on the digital display part 24 will now be described herein below. In response to the turning-on of the power supply on-off switch 27, the measuring circuit 20 is placed in its operational condition and the light emitting element 41 is energized. The light emitted from the light emitting element 41 passes through the linear scale 8 and then through the index scale 36 which will be received by the light-receiving element 38. Since the linear scale 8 moves relative to the index scale 36, the bright and dark patterns of light formed by the culmination of the calibrations 9 on the linear scale 8 and the calibrations on the index scale 36 is sensed by the light receiving element 38 and corresponding electrical pulse output signals of the light-receiving element 38 are applied to the preamplifer 26 of the measuring circuit 20. After amplification, the number of pulses is counted by the counter 25 to be displayed on the digital display 24. The measured dimension can be displayed in inches or millimeters as desired depending on the condition of the inch-millimeter display change-over switch 28 and the dimension display in inches or millimeters can be readily confirmed by the energization of the inch display lamp 28 or the millimeter display lamp 30. Furthermore, it should be apparent that associated with the inch-millimeter display change-over switch 28 is a scaling circuit which scales the amount to be displayed on the digital display 24 based upon the condition of the inch-millimeter display change-over switch 28.

In the above described manner, the outside or inside dimension of an article to be measured can be digitally displayed in inches or millimeters on the digitaly display part 24 when the measuring parts of the caliper body 1 and slider 13 are brought into measuring engagement with the article. Furthermore, by actuating the present switch 31 at any desired time during the measurement, the value being displayed on the digital display part 24 is made to zero by resetting the counter so that a relative distance from that position can now be measured.

It is understood from the above detailed description that the digital display of the measured value on the digital display part 24 can obviate the possibility of misreading, reading errors and human errors. Furthermore, the provision of a built-in power source, which is a rechargeable battery 22, eliminates the necessity for an eternal power supply line such as a cord which limits the field of use of the caliper device so that the caliper device can be readily used in any place where no external power supply is available. It is an additional advantage of the present invention that the electrical processing of the output of the sensor part composed of the light-emitting element 41 and the light-receiving element 38 makes it possible to attain relative measurements such as measurement of a relative position and such measurements were not heretofore possible. Furthermore, in the caliper device according to the present invention, both the linear scale 8 and the index scale 36 are made of a transparent material to constitute a light permeable measuring unit. This provides an additional advantage in that measurement can be obtained with a high accuracy despite of the fact that the measuring unit is relatively inexpensive and losses of light can also be minimized. In addition, in the caliper device of the present invention, the linear scale 8 is provided on the upper face of the caliper body 1 to eliminate formation of a body portion bulging excessively from the lower face of the caliper body 1. This arrangement provides a further advantage that the caliper device exhibits a good design, can stand stably on a table or the like on which it may be placed and does not give the impression of a bulky external appearance. It is a further advantage of the present invention that the measured dimensions can be displayed in inches or millimeters as desired by actuation of the inch-millimeter display change-over switch 28. Also, in the caliper device according to present invention, the extension 21 which accomodates the rechargeable battery 22 is formed on one side wall of the slider 13. This arrangement provides additional advantage in that the extension 21 fits snugly in the palm of a user's hand to facilitate the grasping of the slider 13 in use and the user does not feel the weight of the battery 22.

A holding switch may be additionally provided on the surface panel 23 forming the upper wall of the slider cover 15 so that the measured value displayed on the digital display part 24 may be held without being changed regardless of the sliding movement of the slider 13. In the illustrated embodiment, two separate dust-preventive members 12 made of rubber are employed to enclose the slit 11 of the cover member 10. However, a single thin steel sheet attracted to the cover member 10 by magnetic force may be employed to close the slit 11 of the cover member 10 and may extend through slit formed in the slider base 14 of the slider 13 and the arm 34 may be disposed within said slit. In the illustrating embodiment, the inch display lamp 28 and the millimeter display lamp 30 are selectively energized depending on the condition of the inch-millimeter display change-over switch 28. However, letters indicating inch display or millimeter display may be directly printed on the surface of the inch-millimeter display change-over switch 28. Furthermore, although the counter 25 and the preamplifier 26 of the measuring circuit 20 are separately provided in the embodiment seen in FIG. 3, such parts may be integrally combined in the modification of the present invention.

It should be apparent from the foregoing description that the present invention provides an inexpensive caliper device which can digitally display the measured dimension with high accuracy.

It should be apparent to those skilled in the art that the above described embodiment is merely representative of one embodiment which represents the applications of the principles of the present invention. Numerous and varied other arrangements can be readily devised by those skilled in the art without departing from the spirit and scope of the invention.

I claim:
1. A measuring instrument with digital display comprising:
 a relatively elongated instrument body including a measuring part adapted to make measuring engagement with an article to be measured;
 a transparent scale fixedly disposed on an upper surface of said instrument body with its axis extending in a longitudinal direction of said instrument body, said linear scale further being disposed perpendicu- larly to said body such that a calibrated face of said linear scale forms a right angle with said upper surface of said body;

a slider freely slidable in said longitudinal direction of said instrument body and including a measuring part disposed opposite to said measuring part of said instrument body;

a measuring circuit mounted in said slide and including a digital display means;

a transparent index scale mounted in said slider having a calibrated face disposed opposite to said calibrated face of said linear scale in slightly spaced apart relations; and a light emitting element and a light receiving element mounted in said slider and disposed opposite to each other with said linear scale and said index scale interposed therebetween, said light receiving element being electrically connected to said measuring circuit and generating pulse signals corresponding to movement of said calibrated face past said light emitting element and supplying said pulse signal to said measuring circuit.

2. A measuring instrument with digital display comprising:

a relatively elongated istrument body including a measuring part adapted to make measuring engagement with an article to be measured;

a transparent linear scale fixedly disposed on said instrument body with its axis extending in a longitudinal direction of said instrument body;

a slider freely slidable in said longitudinal direction of said instrument body and including a measuring part disposed opposite of said measuring part of said instrument body;

a measuring surface mounted in said slider and including a digital display means;

an extension formed on one side of a sidewall of said slider, said extension being arranged and configured to accomodate a rechargeable battery provided as a power source for said measuring circuit;

a transparent index scale mounted in said slide having a calibrated face disposed opposite to a calibrated face of said linear scale and slightly spaced apart relations; and a light emitting element and a light receiving element mounted in said slider and disposed opposite of each other with said linear scale and said index scale interposed therebetween, said light receiving element being electrically connected to said measuring circuit and generating pulse signals corresponding to movement of said calibrated face past said light emitting element and supplying said pulse signal to said measuring circuit.

* * * * *